(12) United States Patent
Matsuzaki et al.

(10) Patent No.: US 11,305,437 B2
(45) Date of Patent: Apr. 19, 2022

(54) ROBOT HAND, ROBOT APPARATUS, AND METHOD OF PRODUCING ELECTRONIC APPARATUS

(71) Applicant: SONY CORPORATION, Tokyo (JP)

(72) Inventors: Yosuke Matsuzaki, Kanagawa (JP); Takekazu Kakinuma, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 16/643,063

(22) PCT Filed: Aug. 20, 2018

(86) PCT No.: PCT/JP2018/030599
§ 371 (c)(1),
(2) Date: Feb. 28, 2020

(87) PCT Pub. No.: WO2019/049639
PCT Pub. Date: Mar. 14, 2019

(65) Prior Publication Data
US 2020/0254629 A1 Aug. 13, 2020

(30) Foreign Application Priority Data
Sep. 8, 2017 (JP) .............................. JP2017-172618

(51) Int. Cl.
*B25J 15/08* (2006.01)
*B25J 13/08* (2006.01)
*B25J 9/16* (2006.01)
*B25J 19/02* (2006.01)

(52) U.S. Cl.
CPC ............. *B25J 15/08* (2013.01); *B25J 9/1694* (2013.01); *B25J 13/082* (2013.01); *B25J 19/02* (2013.01)

(58) Field of Classification Search
CPC . B25J 15/08; B25J 15/12; B25J 9/1694; B25J 13/082; B25J 19/02; B25J 15/0009
USPC ........................................ 294/213, 99.1, 106
See application file for complete search history.

(56) References Cited

U.S. PATENT DOCUMENTS

| 4,589,817 | A | | 5/1986 | Adinolfi et al. | |
|---|---|---|---|---|---|
| 4,610,475 | A | * | 9/1986 | Heiserman | ............. B25J 9/1085 294/86.4 |
| 4,696,501 | A | * | 9/1987 | Webb | ..................... B25J 13/082 294/103.1 |

(Continued)

FOREIGN PATENT DOCUMENTS

| EP | 0703646 A2 | 3/1996 |
|---|---|---|
| JP | S62-68229 | 3/1987 |

(Continued)

OTHER PUBLICATIONS

International Search Report prepared by the Japan Patent Office dated Sep. 19, 2018, for International Application No. PCT/JP2018/030599.

*Primary Examiner* — Paul T Chin
(74) *Attorney, Agent, or Firm* — Sheridan Ross P.C.

(57) ABSTRACT

A robot hand according to an embodiment of the present technology includes a finger unit and a guide member. The finger unit is capable of holding a flexible linear member such that the linear member is slidable in a longitudinal direction of the linear member, the linear member being a linear member whose one end is fixed. The guide member is mounted on the finger unit, and includes a guide section that guides the linear member to a predetermined position.

19 Claims, 8 Drawing Sheets

(56) References Cited

U.S. PATENT DOCUMENTS

| | | | | |
|---|---|---|---|---|
| 4,872,803 | A * | 10/1989 | Asakawa | B25J 9/1015 |
| | | | | 414/730 |
| 5,253,911 | A * | 10/1993 | Egan | B25J 9/109 |
| | | | | 294/116 |
| 5,588,341 | A * | 12/1996 | Higuchi | B25B 9/02 |
| | | | | 29/278 |
| 6,189,302 | B1 * | 2/2001 | Kudo | B65B 11/54 |
| | | | | 53/556 |
| 10,632,617 | B2 * | 4/2020 | Takeyama | B25J 15/0253 |
| 2001/0040381 | A1 * | 11/2001 | Tholander | H05K 13/0408 |
| | | | | 294/99.1 |
| 2014/0103676 | A1 * | 4/2014 | Nammoto | B25J 15/0009 |
| | | | | 294/213 |
| 2018/0243907 | A1 * | 8/2018 | Takeyama | B25J 15/103 |
| 2020/0067255 | A1 * | 2/2020 | Takeyama | B25J 13/085 |

FOREIGN PATENT DOCUMENTS

| | | |
|---|---|---|
| JP | H07-15197 | 1/1995 |
| JP | 2000-343164 | 12/2000 |
| JP | 5293039 | 9/2013 |
| JP | 2014-176917 | 9/2014 |
| JP | 2016-097471 | 5/2016 |
| WO | WO 2016/208339 | 12/2016 |
| WO | WO 2017/046975 | 3/2017 |

\* cited by examiner

ROBOT HAND, ROBOT APPARATUS, AND METHOD OF PRODUCING ELECTRONIC APPARATUS

CROSS REFERENCE TO RELATED APPLICATIONS

This application is a national stage application under 35 U.S.C. 371 and claims the benefit of PCT Application No. PCT/JP2018/030599 having an international filing date of 20 Aug. 2018, which designated the United States, which PCT application claimed the benefit of Japanese Patent Application No. 2017-172618 filed 8 Sep. 2017, the entire disclosures of each of which are incorporated herein by reference.

TECHNICAL FIELD

The present technology relates to, for example, a robot hand and a robot apparatus to be used for producing an electronic apparatus, and a method of producing the electronic apparatus.

BACKGROUND ART

For example, in the production of an electronic apparatus, industrial robots are widely used to assemble electronic components. For example, a technology is known that automatically implements a process of a connection between a linear member such as a cable, and a connector component (for example, refer to Patent Literature 1).

CITATION LIST

Patent Literature

Patent Literature 1: Japanese Patent Application Laid-open No. 2014-176917

DISCLOSURE OF INVENTION

Technical Problem

When routing a flexible linear member such as a cable along a predetermined route while successively hooking the linear member on a plurality of hooking claws provided on a work surface, there is a need to guide the cable along the predetermined route while holding the cable with a holding section of a robot hand. However, a finger unit moves above the work surface, so it is not easy to route the cable on the work surface, and thus the cable easily gets loose and easily leaves the work surface locally.

In view of the circumstances described above, it is an object of the present technology to provide a robot hand that can properly guide a flexible linear member on a work surface, a robot apparatus, and a method of producing an electronic apparatus.

Solution to Problem

A robot hand according to an embodiment of the present technology includes a finger unit and a guide member.

The finger unit is capable of holding a flexible linear member such that the linear member is slidable in a longitudinal direction of the linear member, the linear member being a linear member whose one end is fixed.

The guide member is mounted on the finger unit, and includes a guide section that guides the linear member to a predetermined position.

It is possible to properly guide the linear member held by the finger unit to a predetermined position on, for example, the work surface through the guide section, since the robot hand includes the guide member.

The robot hand may further include an elastic member that is mounted between the finger unit and the guide member.

It is possible to route the linear member without the linear member getting loose or leaving the work surface locally, while pressing the linear member against the work surface taking advantage of an elastic force of the elastic member.

The robot hand may further include a sensor that detects a deformation amount of the elastic member, and a control section that outputs a control signal to the finger unit according to an output from the sensor, the control signal controlling a holding force of the finger unit with respect to the linear member.

This makes it possible to control the holding force with respect to the linear member such that the tension applied to the linear member is in a predetermined range.

The elastic member may be formed of a plate spring.

It is possible to properly route the linear member taking advantage of the characteristics of a plate spring in being easily deformed in the thickness direction and in not being easily deformed in the width direction.

The robot hand may further include a slide unit. The slide unit supports the elastic member, and is capable of changing a relative distance between the finger unit and the guide member.

It is possible to adjust an amount of elastic deformation of the elastic member using the relative distance between the finger unit and the guide member.

A robot apparatus according to an embodiment of the present technology includes a robot arm, a finger unit, a guide member, and a control section.

The finger unit is mounted on the robot arm, and is capable of holding a flexible linear member such that the linear member is slidable in a longitudinal direction of the linear member, the linear member being a linear member whose one end is fixed.

The guide member is mounted on the finger unit, and includes a guide section that guides the linear member to a predetermined position.

The control section outputs a control signal to the finger unit according to a movement direction of the guide member, the control signal controlling a holding force of the finger unit with respect to the linear member.

A method of producing an electronic apparatus is a method of producing an electronic apparatus that includes a flexible linear member whose one end is fixed, and a plurality of hooking sections that is provided along a wiring route of the linear member to hook the linear member, and includes holding the linear member using a finger unit of a robot hand.

A portion of the linear member is brought into contact with a surface of the electronic apparatus, the portion of the linear member being supported by a guide member of the robot hand.

A holding force of the finger unit is adjusted to a first holding force with which the linear member is slidable in a longitudinal direction of the linear member, and the guide member is moved while the linear member is being fed.

The holding force of the finger unit is adjusted to a second holding force that is stronger than the first holding force, and the guide member is moved in a direction in which the linear member is hooked on a hooking section.

Advantageous Effects of Invention

As described above, the present technology makes it possible to properly guide a flexible linear member on a work surface.

Note that the effect described herein is not necessarily limitative and may be any effect described in the present disclosure.

BRIEF DESCRIPTION OF DRAWINGS

FIG. 11 is a schematic side view describing an action of the hand section illustrated in FIG. 10B.

MODE(S) FOR CARRYING OUT THE INVENTION

Embodiments according to the present technology will now be described below with reference to the drawings.

First Embodiment

Figure 1:
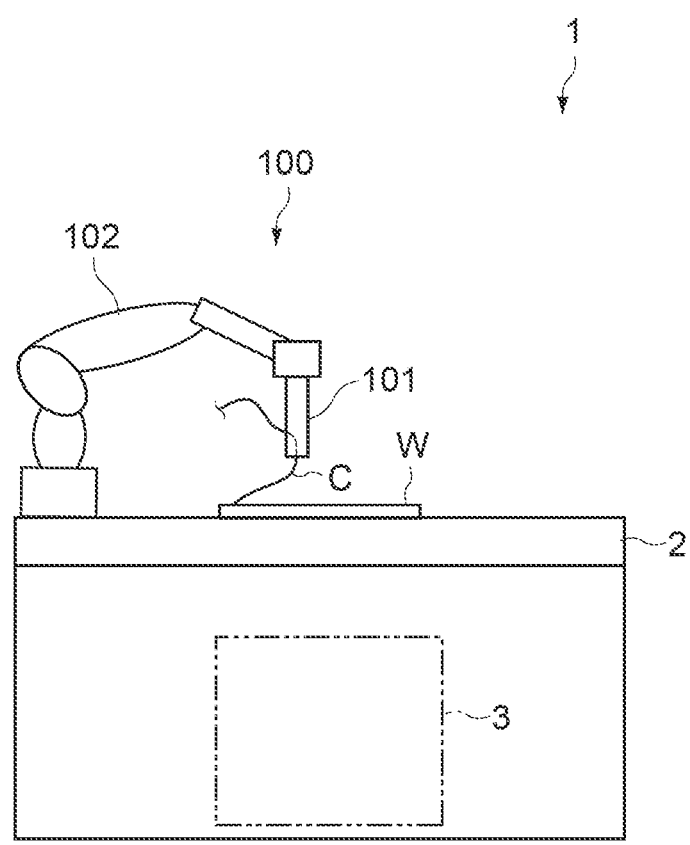
FIG. 1 is a schematic front view of a robot apparatus according to an embodiment of the present technology.

FIG. 1 is a schematic front view of a robot apparatus according to an embodiment of the present technology. In the present embodiment, an example of applying the present technology to an assembly robot used in the process of producing an electronic apparatus, is described.

[Schematic Configuration of Robot Apparatus]

A robot apparatus 1 of the present embodiment includes an assembly robot 100, a work table 2 that supports a semi-finished product (hereinafter also referred to as a work W) of an electronic apparatus, and a controller 3 (a control section) that controls driving of the assembly robot 100.

The assembly robot 100 includes a hand section 101 (a robot hand), and an articulated arm 102 (a robot arm) that can move the hand section 101 to any coordinate position with six degrees of freedom.

The hand section 101 is capable of assembling, to the work W, a flexible linear member (or a band-shaped member. The same applies hereinafter.) C such as a cable, a harness, a flexible flat cable (FFC), and a flexible printed circuit (FPC). Here, one end of the linear member C is connected to an electronic apparatus situated on the work W, and the linear member C is routed along a predetermined route on the work W with the other end being held by the hand section 101.

The articulated arm 102 is connected to a drive unit (not illustrated) disposed on the work table 2 or close to the work table 2. The articulated arm 102 is configured as a transport mechanism that moves the hand section 101 or changes the posture of the hand section 101. The articulated arm 102 typically includes a vertical articulated arm, a horizontal articulated arm, or the like, but may include an XYZ orthogonal robot (three-axis robot) or the like.

The controller 3 typically includes a computer including a central processing unit (CPU) and a memory, and is configured to control driving of the assembly robot 100 in accordance with a program stored in the memory described above.

[Assembly Robot]

Figure 2:
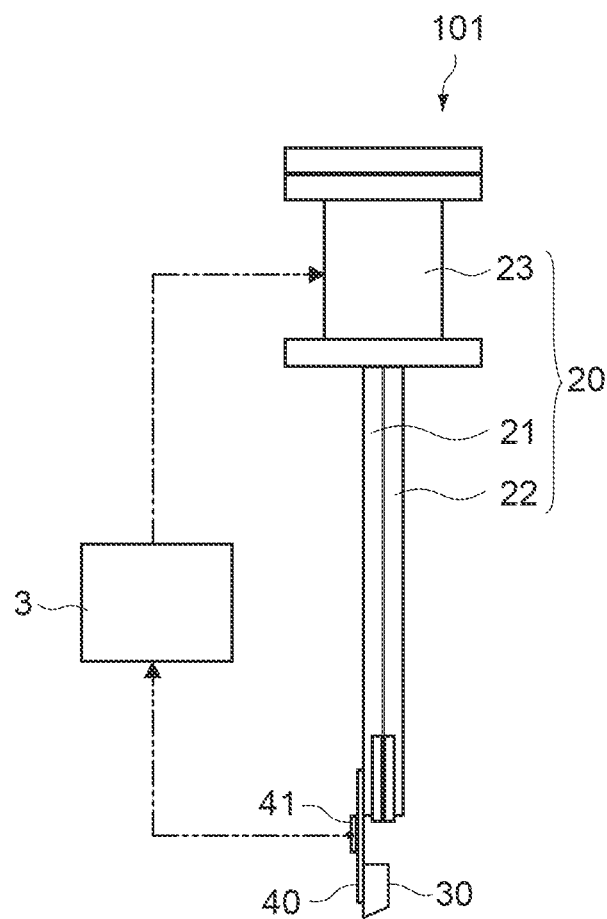
FIG. 2 is a schematic side view of a configuration of a hand section in the robot apparatus.

FIG. 2 is a schematic side view of a configuration of the hand section 101 of the assembly robot 100. In each figure, an X-axis, a Y-axis, and a Z-axis respectively represent directions of three axes that are orthogonal to one another.

As illustrated in FIG. 2, the hand section 101 includes a finger unit 20, a guide member 30, and an elastic member 40.

The finger unit 20 includes first and second finger sections 21 and 22 that are made of metal, and a mechanism section 23, the first and second finger sections 21 and 22 facing each other in the X-axis direction and extending in the Z-axis direction. The finger unit 20 is capable of holding the linear member C.

The mechanism section 23 is mounted on the articulated arm 102, and includes a drive mechanism that opens and closes the first and second finger sections 21 and 22 in the X-axis direction. The mechanism section 23 may be configured to drive the first and second finger sections 21 and 22 in synchronization with each other, or may be configured to move one of the finger sections relative to the other finger section.

An air cylinder is typically adopted as the drive mechanism. The holding force of the finger unit 20 can be substantially linearly changed according to the air pressure introduced into the air cylinder. In addition to the air cylinder, other fluid pressure cylinders such as an oil hydraulic cylinder, an electric motor, a spring mechanism, and the like can be adopted as the drive mechanism.

Figure 3:
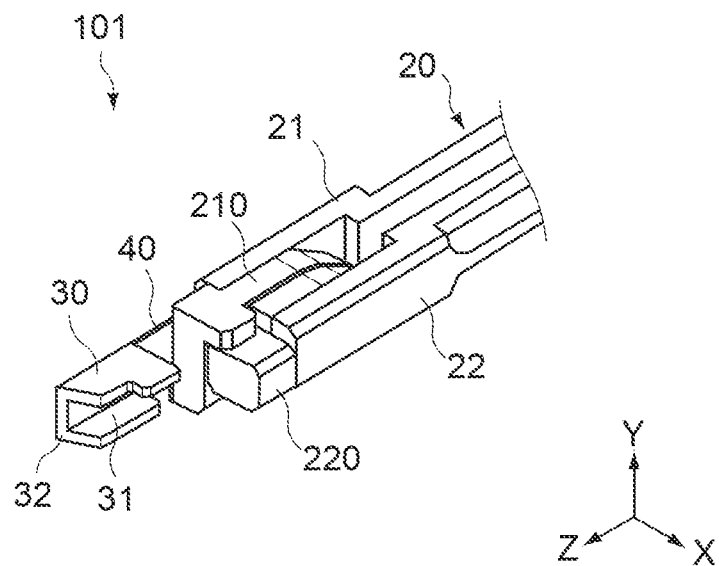
FIG. 3 is an enlarged major-portion perspective view illustrating a closed state of a finger unit of the hand section.
Figure 4:
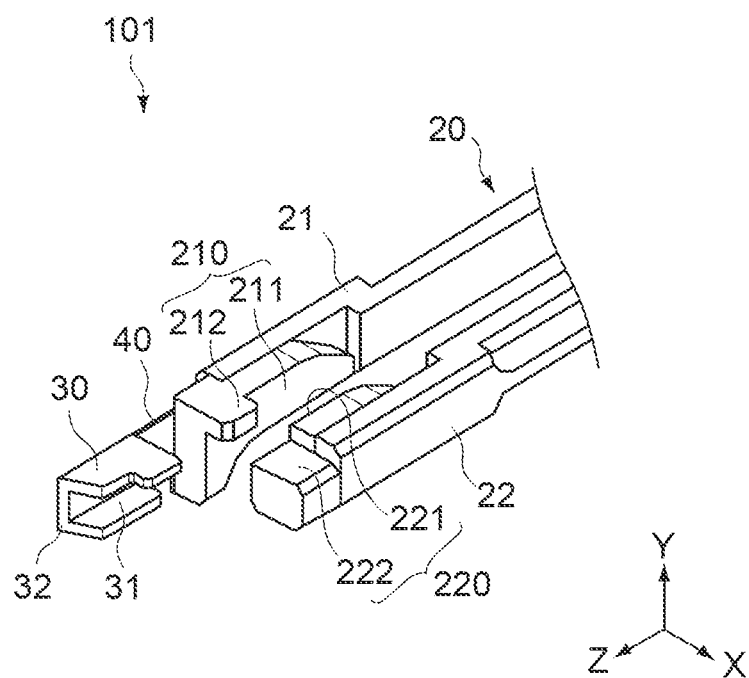
FIG. 4 is a major-portion perspective view illustrating an open state of the finger unit illustrated in FIG. 3.
Figure 5:
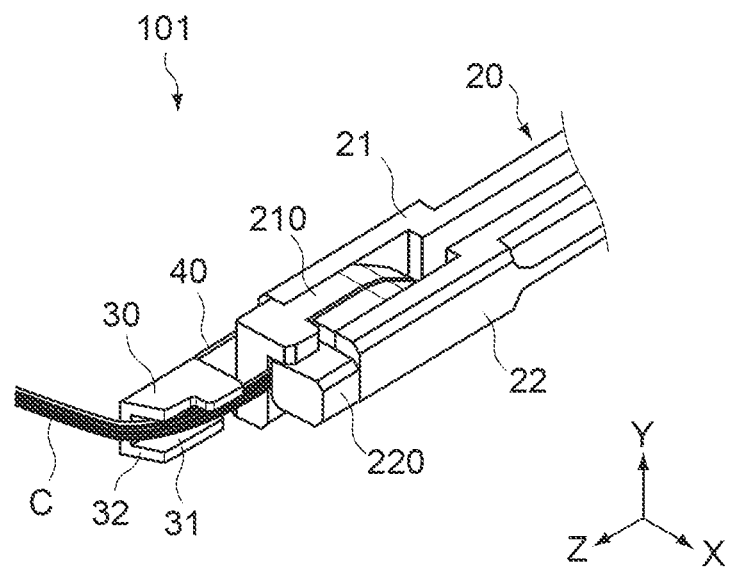
FIG. 5 is a major-portion perspective view illustrating a clamping state in which a linear member C is clamped by the finger unit 20 illustrated in FIG. 3.

FIG. 3 is an enlarged major-portion perspective view illustrating a closed state of the finger unit 20, FIG. 4 is a major-portion perspective view illustrating an open state of the finger unit 20 illustrated in FIG. 3, and FIG. 5 is a major-portion perspective view illustrating a clamping state in which the linear member C is clamped by the finger unit 20 illustrated in FIG. 3.

The finger unit 20 includes a pair of pads 210 and 220. One of the pads, the pad 210, is integrally fixed to an inner surface of a tip portion of one of the finger sections, the finger section 21, and the other pad, the pad 220, is integrally fixed to an inner surface of a tip portion of the other finger section, the finger section 22. The pads 210 and 220 are made of synthetic resin material such as fluororesin that is excellent in resistance to abrasion.

The paired pads 210 and 220 respectively include clamping surfaces 211 and 221 that are formed in a plane parallel to a YZ plane, the clamping surfaces 211 and 221 catching the linear member C between the clamping surfaces 211 and 221 in the X-axis direction to clamp (hold) the linear member C. The finger unit 20 is capable of adjusting, according to an output from the controller 3, the holding force to a first holding force or a second holding force, the first holding force being a holding force with which the linear member C can be slid with respect to the clamping surfaces 211 and 221 in a longitudinal direction of the linear member C, the second holding force being stronger than the first holding force. Here, the first holding force with which the slide in the longitudinal direction is possible refers to a holding force with which the linear member C can be drawn out from the finger unit 20 by use of a tension applied during routing work. On the other hand, the second holding force typically refers to a holding force with which it is possible to resist the tension described above to prevent the linear member C from sliding.

The paired pads 210 and 220 respectively include fitting sections 212 and 222 on the sides of the respective tips of the finger sections 21 and 22, the fitting sections 212 and 222 facing each other in the Y-axis direction when the finger unit 20 is closed. Although the fitting sections 212 and 222 are each provided only on one side in the Y-axis direction, the configuration is not limited to this, and the fitting sections 212 and 222 may also be provided on the other side in the Y-axis direction.

The guide member 30 is mounted on a tip portion of the finger unit 20 through the elastic member 40. In the present embodiment, the guide member 30 is mounted on the tip portion of the first finger section 21 through the elastic member 40.

The guide member 30 includes a guide section 31 that guides the linear member C to a predetermined position. The guide section 31 has a groove shape that makes it possible to accommodate, in the guide section 31, a portion of the linear member C held by the finger unit 20.

Here, the predetermined position typically refers to a position for routing the linear member C or a position for assembling the linear member C on the work W, and corresponds to, for example, a position of or near a hooking section such as a hooking groove Wb (FIG. 6) and a hooking claw Wc (FIG. 7A) that are used to hook the linear member C on the work W.

The guide section 31 is opened to be oriented toward the second finger section 22 from the first finger section 21. This makes it possible to efficiently accommodate, in the guide section 31, a portion of the linear member C hanging down from the clamping surfaces 211 and 221 when an axial direction of the finger unit 20 is oriented toward the vertical direction. Although the guide section 31 has a shape of a rectangular groove, the shape of the guide section 31 is not limited to this, and the guide section 31 may have any other shape such as a shape of a circular groove or a triangular groove.

Figure 6:
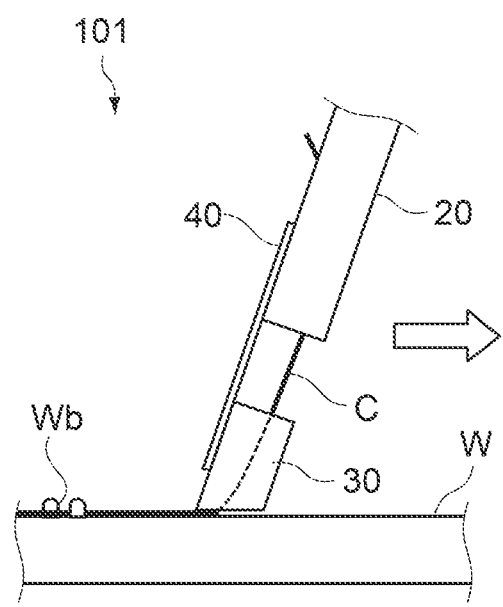
FIG. 6 is a schematic side view describing an action of the hand section.

The guide member 30 further includes a guide surface 32 that faces the surface of the work W. As illustrated in FIG. 6, the finger unit 20 is maintained to be in a posture of being inclined at a predetermined angle (such as 10 to 15°) in a forward direction with respect to the work surface W during work of routing the linear member C. The guide surface 32 includes a tapered surface that can face the surface of the work W in the inclination posture.

The guide member 30 is excellent in resistance to abrasion, and is made of synthetic resin material such as polyacetal (POM) that has a low coefficient of friction with respect to the linear member C. The guide member 30 guides the linear member C in a movement direction of the hand section 101 (the finger unit 20) while pressing the linear member C against the surface of the work W with a predetermined force, the linear member C being accommodated in the guide section 31 in a state of being held by the finger unit 20 with the first holding force described above.

The elastic member 40 is mounted between the finger unit 20 (the first finger section 21) and the guide member 30, and supports the guide member 30 such that the guide member 30 can be displaced relative to the finger unit 20.

When the linear member C is routed along the surface of the work W, as illustrated in FIG. 6, the elastic member 40 generates an elastic force that applies the predetermined pressure described above on the guide member 30. Accordingly, a certain tension is applied to the linear member C, and thus, it is possible to prevent, for example, the linear member C from getting loose. Further, it is possible to properly push the linear member C into, for example, the hooking groove Wb (refer to FIG. 6) provided on the surface of the work W.

In the present embodiment, the elastic member 40 is formed of a plate spring member whose width direction is the Y-axis direction. This makes it possible to displace the guide member 30 relative to the finger unit 20 in the X-axis direction while restricting the movement of the guide member 30 in the Y-axis direction with respect to the finger unit 20. As described above, a function of guiding the linear member C performed by the guide member 30 is improved by a direction of relative displacement of the guide member 30 with respect to the finger unit 20 being anisotropic. This makes it possible to accurately perform work of hooking the linear member C on a hooking section such as the hooking groove Wb or the hooking claw (refer to FIGS. 7A and 7B) that is provided on the surface of the work W, which will be described later.

As illustrated in FIG. 2, the hand section 101 further includes a sensor 41 that detects a deformation amount of the elastic member 40. The sensor 41 includes a distortion sensor that is mounted on a deformation region of the elastic member 40. The output of the sensor 41 is output to the controller 3. The controller 3 is configured to output, to the finger unit 20 (the mechanism section 23), a control signal that controls a holding force with respect to the linear member C according to the output from the sensor 41.

[Controller]

The controller 3 detects the deformation amount of the elastic member 40 in real time using the sensor 41, and adjusts the holding force of the finger unit 20 such that the deformation amount of the elastic member 40 exhibits a predetermined value (or a value in a predetermined range). For example, when the deformation amount of the elastic member 40 is greater than the predetermined value (or the value in the predetermined range), the controller 3 determines that the tension applied to the linear member C is high, and outputs a control signal that makes the holding force weak. On the other hand, when the deformation amount of the elastic member 40 is less than the predetermined value (or the value in the predetermined range), the controller 3 determines that the tension applied to the linear member C is low, and outputs a control signal that makes the holding force strong.

In particular, when there is a difference in force of friction between the fitting sections 212 and 221 of the pads 210 and 220, and the linear member C depending on the type or the lot of the linear member C, a variation in a tension applied to the linear member C occurs, and thus a variation in work quality occurs. According to the present embodiment, it is possible to eliminate a variation in work and to achieve a constant quality by adjusting a holding force of the finger unit 20 using the output from the sensor 41 such that the tension applied to the linear member C is constant. Further, it becomes possible to confirm success or failure regarding work of routing the linear member C and work of hooking the linear member C on a hooking section, by analyzing the output from the sensor 41 during work. This results in the advantage of there being no need for an inspection process, in a post-process, for confirming whether work has been properly done.

Further, the controller 3 is configured to output, to the finger unit 20, a control signal that adjusts the holding force with respect to the linear member C depending on the movement direction of the finger unit 20. For example, when routing the linear member C on the surface of the work W while feeding the linear member C, the holding force of the finger unit 20 is adjusted to a holding force (the first holding force) with which the linear member C can be slid, and when hooking the linear member C on a hooking claw, the holding force of the finger unit 20 is adjusted to a holding force (the second holding force) with which it is possible to prevent the linear member C from sliding.

[Operation of Robot Apparatus]

Next, typical operations of the robot apparatus 1 configured as described above are described.

Figure 7A:
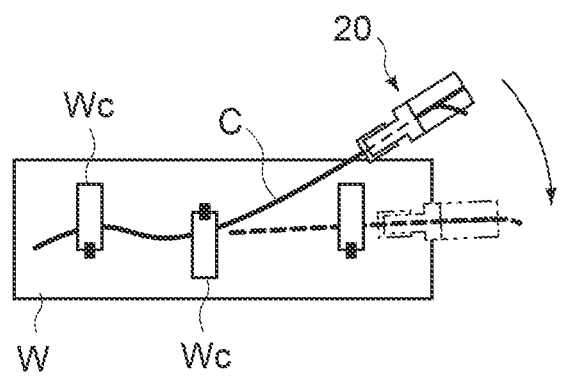
FIG. 7A is a plan view schematically illustrating work of routing a linear member using the robot apparatus.
Figure 7B:
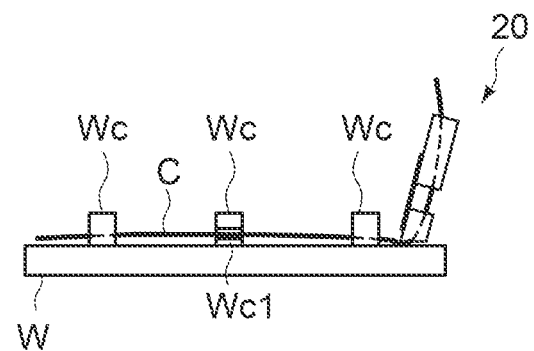
FIG. 7B is a side view schematically illustrating the work of routing a linear member using the robot apparatus.

As described above, the robot apparatus 1 of the present embodiment performs work of routing, on the surface of the work N and along a predetermined route, the linear member C whose one end is fixed, while holding the other end of the linear member C with the hand section 101. For example, FIGS. 7A and 7B schematically illustrate work of routing the linear member C while successively hooking the linear member C on a plurality of hooking claws Wc provided on the surface of the work N in order from left to right.

The surface of the work W may be a top surface or a side surface of the work W. The hooking claw Wc is provided with an open groove Wc1 at its end portion in the longitudinal direction, and the linear member C is hooked by being moved from the side of the open groove Wc1 in a direction parallel to the surface of the work W. The open grooves Wc1 are provided to the respective hooking claws Wc such that the open groove Wc1 is opened to be oriented toward a direction opposite to the direction of an adjacent open groove.

Figure 8:
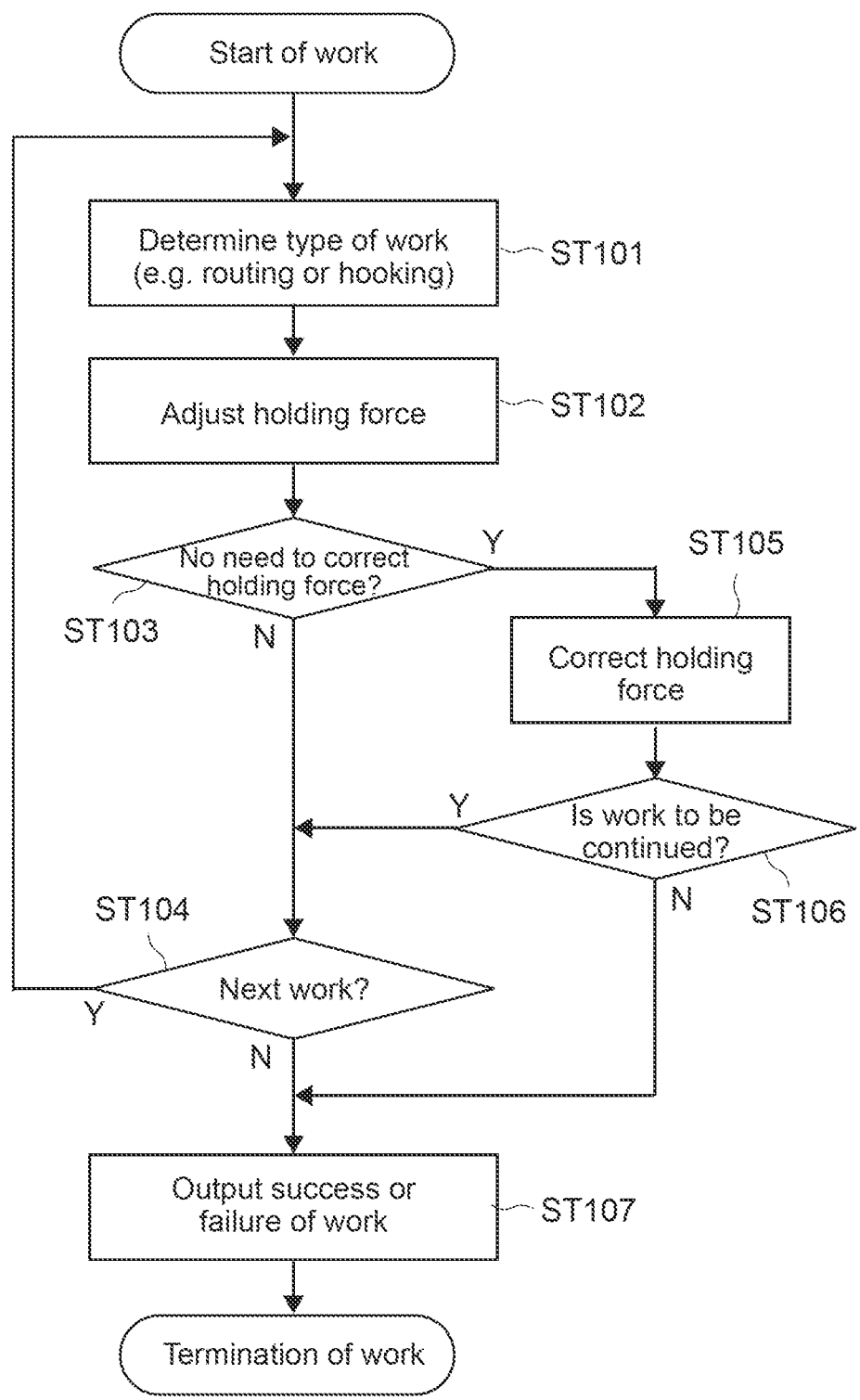
FIG. 8 is a flowchart of an example of a procedure of processing performed in a controller included in the robot apparatus.

FIG. 8 is a flowchart of an example of a procedure of processing performed in the controller 3

The hand section 101 holds a predetermined portion of the linear member C using the finger unit 20. Regarding a pickup of the linear member C from the surface of the work W, the pickup may be performed by the hand section 101 (the finger unit 20) itself, or the pickup may be performed by the linear member C being passed to the hand section by an auxiliary robot (not illustrated).

At the time of a start of work, the controller 3 causes the hand section 101 to stand up such that the axial direction of the finger unit 20 is the vertical direction. Accordingly, a portion situated on the side of the one end of the linear member C hanging down from the finger unit 20, is accommodated in the guide section 31 of the guide member 30.

The controller C determines the type of work performed by the hand section 101 (Step 101). Here, two types of works that are routing work that feeds the linear member C out of the finger unit 20 while holding the linear member C, and hooking work that hooks the linear member C on the hooking claw Wc are described as examples of the type of work.

(Routing Work)

In the routing work, the linear member C whose one end is fixed on the work W is routed on the surface of the work W along a predetermined route, while a predetermined tension is being applied to the linear member C. Before the routing work is performed, in a state in which the predetermined tension is applied to the linear member C using the finger unit 20, the hand section 101 goes down up to a position at which the linear member C accommodated in the guide section 31 comes into contact with the surface of the work W. Here, an elastic force of the elastic member 40 protects the linear member C from a collision between the guide member 30 and the work W.

The controller 3 outputs a control signal for adjusting the holding force of the finger unit 20 to a holding force set for work of routing the linear member C (Step 102). The finger unit 20 receives the control signal from the controller 3, and sets, to be the holding force with respect to the linear member C, the first holding force (F1) that is a holding force with which the linear member C can be slid with respect to the pads 210 and 220 in the longitudinal direction.

The controller 3 inclines the hand section 101 forward at a predetermined angle in a direction in which the guide section 31 of the guide member 30 is opened, and starts moving the hand section 101 along the surface of the work W while elastically deforming the elastic member 40 in its thickness direction. Consequently, in a state of being held by the finger unit 20, the linear member C slides with respect to the pads 210 and 220 in the length direction, so as to be fed backward.

A tension depending on the holding force of the finger unit 20 and the deformation amount of the elastic member 40 is applied to the linear member C. Then, according to the output from the sensor 41 mounted on the elastic member 40, the controller 3 determines whether there is a need to correct the holding force of the finger unit 20 with respect to the linear member C (Step 103). When the controller 3 determines that there is no need for the correction, the controller 3 continues the work, and when the controller 3 determines that there is a need for the correction, the controller 3 corrects the holding force (Step 105). The controller 3 may correct the holding force while moving the hand section 101, or may correct the holding force after stopping moving the hand section 101.

The method of adjusting a tension applied to the linear member C is not limited to the method of adjusting a holding force of the finger unit 20, and a method of adjusting a force of pressing the linear member C against the surface of the work W may be adopted. In other words, the adjustment of an elastic force depending on the deformation amount of the elastic member 40 also makes it possible to adjust a tension applied to the linear member C.

When a desired tension applied to the linear member C has been obtained due to the correction of the holding force of the finger unit 20, the controller 3 continues the work, and when the desired tension applied to the linear member C has still not been obtained due to the correction of the holding force, the controller 3 stops continuing the work since there is a possibility that the disconnection of the linear member C or a failure in the hand section 101 has occurred (Step 106).

(Hooking Work)

After the linear member C is guided up to a position near the hooking section Wc, the controller 3 switches the work mode from routing work to hooking work, and outputs a control signal for adjusting the holding force of the finger unit 20 to a holding force set for work of hooking the linear member C (Steps 104 and 102). The finger unit 20 receives the control signal from the controller 3, and sets, to be the holding force with respect to the linear member C, the second holding force (F2) that is stronger than the first holding force (F1).

In the hooking work, the hand section 101 is moved in a direction in which the linear member C is hooked in a hooking groove of the hooking claw Wc, while a predetermined tension is being applied to the linear member C (refer to FIG. 7A). Since the slide of the linear member C with respect to the finger unit 20 is prevented, it is possible to accurately guide a predetermined portion of the linear member C to a hooking groove Wc1 of the hooking claw Wc.

Further, the elastic deformation of the elastic member 40 in a width direction of the elastic member 40 is restricted by the hand section 101 being moved in the width direction, the elastic member 40 being formed of a plate spring member. This makes it possible to insert the linear member C into the hooking groove Wc1 with a certain pressing force by just controlling the position of the hand section 101. For example, it is possible to stably hook a cable having a wire diameter of 0.7 mm on a hooking claw with a height of 2 mm.

Figure 9:
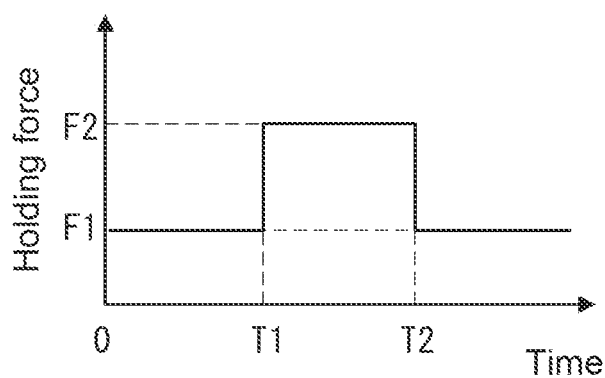
FIG. 9 is a timing chart illustrating an example of an adjustment of a holding force of the finger unit that is performed by the controller.
Figure 10A:
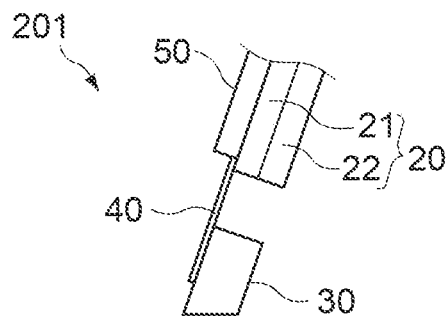
FIG. 10A is a schematic major-portion side view illustrating an example of a hand section according to a second embodiment of the present technology.
Figure 10B:
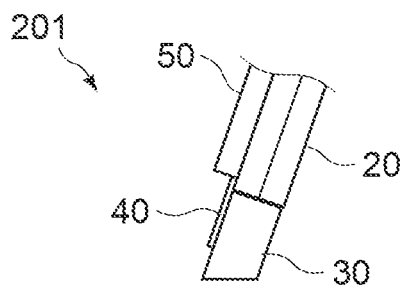
FIG. 10B is a schematic major-portion side view illustrating another example of the hand section illustrated in FIG. 10A.

By the operations described above being repeatedly performed, the linear member C is routed on the surface of the work W while being successively hooked on a plurality of hooking claws Wc. FIG. 9 is a timing chart illustrating an example of an adjustment of a holding force of the finger unit 20 that is performed by the controller 3. In the figure, the holding force F1 (a process of routing work) is applied between times T0 and T1 and between times T1 and T2, and the holding force F2 (a process of hooking work) is applied between times T1 and T2.

After a series of work is completed, the controller 3 outputs a confirmation result of success or failure of work according to an output from the sensor 41 (Step 107).

As described above, the present embodiment makes it possible to properly guide the linear member C held by the finger unit 20 to a predetermined position on the work W through the guide member 30, since the hand section 101 includes the guide member 30. Thus, it is possible to easily perform work of routing a flexible object even in a narrow region while restricting the behavior of the flexible object using a single hand.

Since the hand section 101 includes the elastic member 40 mounted between the finger unit 20 and the guide member 30, it is possible to perform work while pressing the flexible linear member C against the surface of the work W taking advantage of an elastic force of the elastic member 40. This makes it possible to route the linear member C without the linear member C getting loose or leaving the surface of the work W locally. Further, it is possible to compensate for a shift of the position of a set and a deviation of a motion of a robot by elastically deforming the elastic member 40, and this makes it possible to also cope with a high-speed motion.

Furthermore, since it is possible to adjust a holding force of the finger unit 20 according to an output from the sensor that detects a deformation amount of the elastic member 40, it is possible to route the linear member C along a predetermined route while keeping the tension applied to the linear member C constant. Moreover, since it is possible to adjust stress and a feeding amount during work for each content of work, it is possible to improve the flexibility and the accuracy in work.

Second Embodiment

Figure 12A:
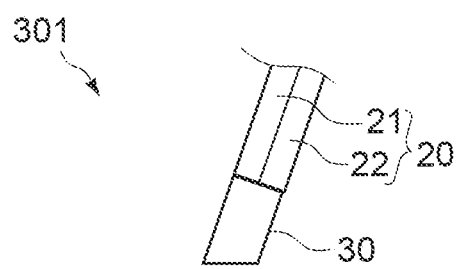
FIG. 12A is a schematic side view of a modification of the configuration of the hand section according to the embodiments of the present technology.
Figure 12B:
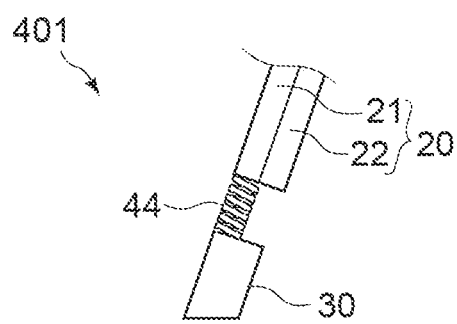
FIG. 12B is a schematic side view of another modification of the configuration of the hand section according to the embodiments of the present technology.

FIGS. 12A and 12B are schematic side views of configurations of a hand section according to another embodiment of the present technology. In the following descriptions, a configuration different from that of the first embodiment is primarily described, and a configuration similar to that of the first embodiment is denoted by the same reference symbol and a description thereof is omitted or simplified.

A hand section 201 of the present embodiment includes the finger unit 20, the guide member 30, the elastic member 40, and a slide unit 50. The slide unit 50 supports the elastic member 40, and is capable of changing a relative distance between the finger unit 20 and the guide member 30.

The slide unit 50 is mounted on the finger unit 20 (in the illustrated example, the first finger section 21). The elastic member 40 is formed of a plate spring member, in which one end of the elastic member 40 is fixed to the slide unit 50, and the other end is fixed to the guide member 30. The slide unit 50 includes a linear actuator that is capable of reciprocating the elastic member 40 in the axial direction of the finger unit 20. The type of linear actuator is not particularly limited, and the linear actuator may be a fluid pressure actuator or an electric actuator.

The slide unit 50 is capable of switching between a first state and a second state, the first state being a state in which the guide member 30 is situated separately from the finger unit 20, as illustrated in FIG. 12A, the second state being a state in which the guide member 30 is situated close to the finger unit 20, as illustrated in FIG. 12B. The slide unit 50 may be capable of stopping the guide member 30 at any position between the first state and the second state.

The relative distance between the finger unit 20 and the guide member 30 in the first state is not particularly limited, and, for example, a distance similar to that of the first embodiment is set to be the relative distance. This makes it possible to apply an appropriate tension to the linear member C and to compensate for a shift of the position of a set and for a deviation of a motion of a robot, using the elastic deformation of the elastic member 40, as in the case of the first embodiment.

Figure 11:
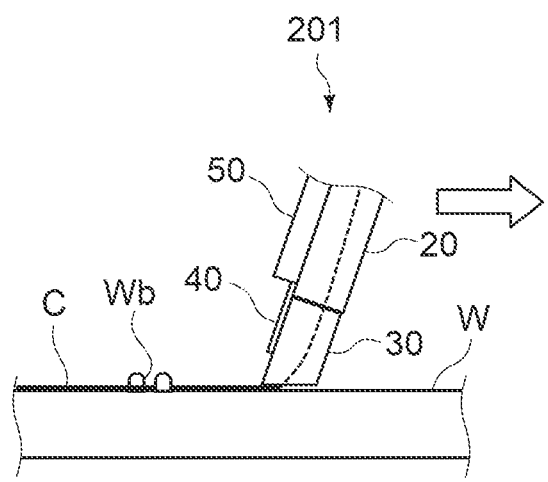
[FIG. 11]

On the other hand, the relative distance between the finger unit 20 and the guide member 30 in the second state is also not particularly limited, and typically, a distance (such as zero or a value close to zero) that does not cause the elastic deformation of the elastic member 40 during work of routing the linear member C, is set to be the relative distance. This makes it possible to directly apply, to the linear member C, a pressing force from the hand section 101 without using an elastic force of the elastic member 40. Thus, as illustrated in, for example, FIG. 11, it is possible to properly hook the linear member C in the hooking groove Wb that is a hooking section for which a relatively strong pressing force is necessary.

Although the embodiments of the present technology have been described above, of course the present technology is not limited only to the embodiments described above and various modifications may be made thereto.

For example, in the embodiments described above, the robot apparatus including the elastic member 40 has been described as an example, but the installation of the elastic member 40 may be omitted. In this case, the guide member 30 is directly mounted on the tip portion of the finger unit 20 (the first finger section 21), or is mounted thereon through a relatively highly rigid support plate. FIG. 12A schematically illustrates a configuration of a hand section 301 in which the guide member 30 is directly mounted on the tip portion of the finger unit 20 (the first finger section 21). In this case, the guide member 30 may be made of elastic material such as a synthetic rubber.

In the embodiments described above, the respective finger sections 21 and 22 of the finger unit 20 are configured to hold the linear member C through the pads 210 and 220, but the pads 210 and 220 may be omitted and the respective finger sections 21 and 22 may be configured to directly hold the linear member C.

In the embodiments described above, an example in which the elastic member 40 is formed of a plate spring member has been described, but the configuration is not limited to this, and an elastic member 44 may be made of a coil spring, as illustrated in FIG. 12B.

Further, in the embodiments described above, the robot used to perform work of routing a linear member has been described as an example of the robot apparatus, but the application is not limited to this, and it is also applicable to other uses such as work of wiring connection to a connector, or work of attaching, for example, a label sticker or tape. Furthermore, the robot apparatus is not limited to an industrial robot, and is also applicable to a home robot or a medical robot.

Note that the present technology may also take the following configurations.

(1) A robot hand including:
a finger unit that is capable of holding a flexible linear member such that the linear member is slidable in a longitudinal direction of the linear member, the linear member being a linear member whose one end is fixed; and
a guide member that is mounted on the finger unit, and includes a guide section that guides the linear member to a predetermined position.

(2) The robot hand according to (1), further including an elastic member that is mounted between the finger unit and the guide member.

(3) The robot hand according to (2), further including:
a sensor that detects a deformation amount of the elastic member; and
a control section that outputs a control signal to the finger unit according to an output from the sensor, the control signal controlling a holding force of the finger unit with respect to the linear member.

(4) The robot hand according to (2) or (3), in which the elastic member is formed of a plate spring.

(5) The robot hand according to any one of (2) to (4), further including a slide unit that supports the elastic member, and is capable of changing a relative distance between the finger unit and the guide member.

(6) A robot apparatus including:
a robot arm;
a finger unit that is mounted on the robot arm, and is capable of holding a flexible linear member such that the linear member is slidable in a longitudinal direction of the linear member, the linear member being a linear member whose one end is fixed;
a guide member that is mounted on the finger unit, and includes a guide section that guides the linear member to a predetermined position; and
a control section that outputs a control signal to the finger unit according to a movement direction of the guide member, the control signal controlling a holding force of the finger unit with respect to the linear member.

(7) A method of producing an electronic apparatus that includes a flexible linear member whose one end is fixed, and a plurality of hooking sections that is provided along a wiring route of the linear member to hook the linear member, the method including:
holding the linear member using a finger unit of a robot hand;
bringing a portion of the linear member into contact with a surface of the electronic apparatus, the portion of the linear member being supported by a guide member of the robot hand;
adjusting a holding force of the finger unit to a first holding force with which the linear member is slidable in a longitudinal direction of the linear member, and moving the guide member while feeding the linear member; and
adjusting the holding force of the finger unit to a second holding force that is stronger than the first holding force, and moving the guide member in a direction in which the linear member is hooked on a hooking section.

REFERENCE SIGNS LIST

1 robot apparatus
3 controller
20 finger unit
21 first finger section
22 second finger section
30 guide member
31 guide section
40,44 elastic member
41 sensor
50 slide unit
101 hand section
102 articulated arm
C linear member
W work

What is claimed is:

1. A robot hand, comprising:
a finger unit that is capable of holding a flexible linear member such that the linear member is slidable in a longitudinal direction of the linear member, the linear member being a linear member whose one end is fixed;
a guide member that is mounted on the finger unit, and includes a guide section that guides the linear member to a predetermined position; and
an elastic member that is mounted between the finger unit and the guide member, wherein the guide member is joined to the finger unit by the elastic member.

2. The robot hand according to claim 1, further comprising:
a sensor that detects a deformation amount of the elastic member; and
a control section that outputs a control signal to the finger unit according to an output from the sensor, the control signal controlling a holding force of the finger unit with respect to the linear member.

3. The robot hand according to claim 1, wherein the elastic member is formed of a plate spring.

4. The robot hand according to claim 1, wherein the finger unit includes a first finger section and a second finger section, and wherein the finger unit is capable of holding the linear member between the first finger section and the second finger section.

5. The robot hand according to claim 4, wherein the guide member is joined to the first finger section by the elastic member.

6. The robot hand according to claim 5, wherein the guide section has a groove shape.

7. The robot hand according to claim 6, wherein an opening of the groove shape is oriented towards the second finger section.

8. The robot hand according to claim 5, wherein the elastic member is a plate spring member, wherein the first and second finger sections move relative to one another along an X-axis direction, and wherein the elastic member is displaceable along the X-axis direction.

9. The robot hand according to claim 4, further comprising:
a drive mechanism, wherein the drive mechanism operates to open or close the first and second finger sections.

10. The robot hand according to claim 4, further comprising:
a pair of pads, wherein a first one of the pads is fixed to an inner surface of the first finger section, and wherein a second one of the pads is fixed to an inner surface of the second finger section.

11. A robot hand, comprising:
a finger unit that is capable of holding a flexible linear member such that the linear member is slidable in a longitudinal direction of the linear member, the linear member being a linear member whose one end is fixed;
a guide member that is mounted on the finger unit, and includes a guide section that guides the linear member to a predetermined position;
an elastic member that is mounted between the finger unit and the guide member; and
a slide unit that supports the elastic member, and is capable of changing a relative distance between the finger unit and the guide member.

12. The robot hand according to claim 11, further comprising:
a sensor that detects a deformation amount of the elastic member; and
a control section that outputs a control signal to the finger unit according to an output from the sensor, the control signal controlling a holding force of the finger unit with respect to the linear member.

13. The robot hand according to claim 11, wherein the elastic member is formed of a plate spring.

14. The robot hand according to claim 11, wherein the finger unit includes a first finger section and a second finger section, and wherein the finger unit is capable of holding the linear member between the first finger section and the second finger section.

15. The robot hand according to claim 14, further comprising:
a drive mechanism, wherein the drive mechanism operates to open or close the first and second finger sections.

16. The robot hand according to claim 14, further comprising:
a pair of pads, wherein a first one of the pads is fixed to an inner surface of the first finger section, and wherein a second one of the pads is fixed to an inner surface of the second finger section.

17. The robot hand according to claim 14, wherein the guide section has a groove shape.

18. The robot hand according to claim 17, wherein an opening of the groove shape is oriented towards the second finger section.

19. A method of producing an electronic apparatus that includes a flexible linear member whose one end is fixed, and a plurality of hooking sections that is provided along a wiring route of the linear member to hook the linear member, the method comprising:
holding the linear member using a finger unit of a robot hand;
bringing a portion of the linear member into contact with a surface of the electronic apparatus, the portion of the linear member being supported by a guide member of the robot hand;
adjusting a holding force of the finger unit to a first holding force with which the linear member is slidable in a longitudinal direction of the linear member, and moving the guide member while feeding the linear member; and
adjusting the holding force of the finger unit to a second holding force that is stronger than the first holding force, and moving the guide member in a direction in which the linear member is hooked on a hooking section.

* * * * *